Dec. 18, 1928.
J. C. SANDERS
1,695,611
ADJUSTABLE AIRPLANE STRUT TERMINAL
Filed Dec. 8, 1927
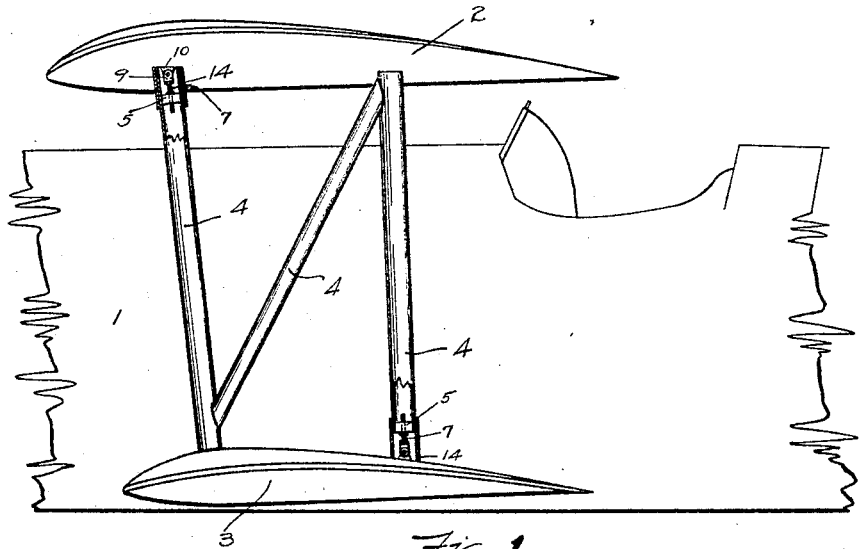
Fig-1
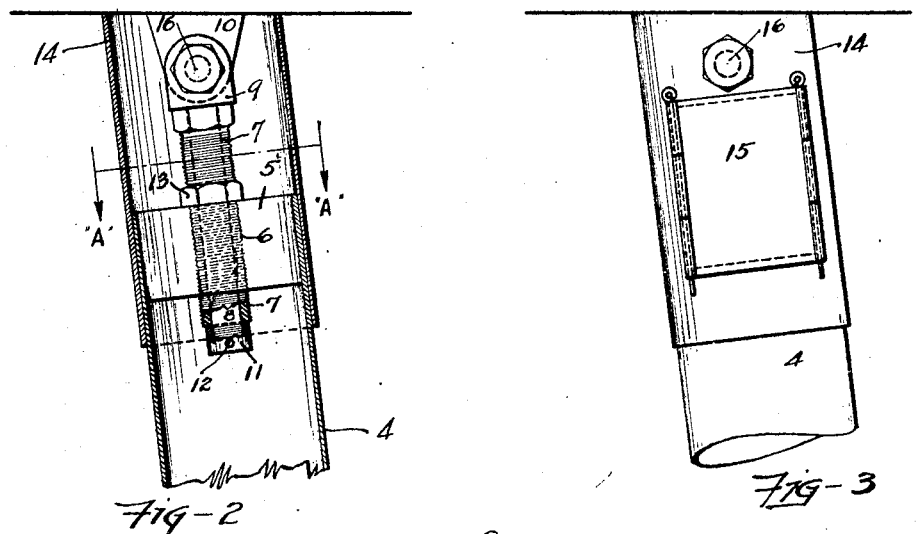
Fig-2
Fig-3
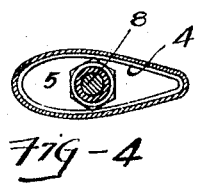
Fig-4
INVENTOR
John C. Sanders
BY
James Douglas Livnan,
ATTORNEY Patented Dec. 18, 1928.

1,695,611

UNITED STATES PATENT OFFICE.

JOHN C. SANDERS, OF SEATTLE, WASHINGTON, ASSIGNOR TO BOEING AIRPLANE COMPANY, OF SEATTLE, WASHINGTON.

ADJUSTABLE AIRPLANE STRUT TERMINAL.

Application filed December 8, 1927. Serial No. 238,519.

This invention relates to airplanes, and more particularly to improvements in the manner and method of adjustably fastening strut ends to airplane wing structures.

A principal object of the invention is to so construct and relate the elements comprised in the strut fastening means as to provide a simple, efficient and inexpensive device which will greatly facilitate rigging because of its range of adjustability after the strut has been mounted to the wing structure, thus eliminating the necessity of removing the strut in order to adjust the terminal, either for aligning the ship in the process of rigging, or for incidence or dihedral alteration.

Another object of the invention is to so relate the elements, which enter into the construction of the device, that they may be entirely confined within the strut, and thus hidden from the line of air rush incident to flight. Obviously the head resistance which such elements ordinarily offer is wholly eliminated.

In attaining the above objects, I aim at the same time to simplify the construction of the component parts of the device, and to so arrange such parts that they may be readily accessible, and if desired, visible; visibility and accessibility being obtained by the use of either a transparent or opaque cover plate, removably secured to the strut in the proximity of the fastening device.

These and other objects will appear as my invention is more fully hereinafter described in the following specification, illustrated in the accompanying drawing, and finally pointed out in the appended claim.

In the drawings:

Figure 1 is a fragmentary side elevation of an airplane provided with the conventional upper and lower wing members, showing my improved device and strut members, in operative engagement therebetween.

Figure 2 is an enlarged side elevation of my device, showing the fairing and a fragment of the strut in section.

Figure 3 is a view showing the cover plate in position over the access opening.

Figure 4 is a sectional plan view taken on the line "A"—"A" of Fig. 2.

Referring now more particularly to the drawings:

Reference numeral 1 indicates the usual body or fuselage of an airplane, having upper and lower wings, 2 and 3 respectively. 4 indicates strut members provided with my improved form of adjustable terminals, and as they are identical with each other, a description of one will suffice for both. Within the uppermost end of the strut 4 a block 5 is securely mounted by any suitable means, such, for instance, as rivets, bolts, welding or the like. The block 5 is apertured and internally threaded as at 6 to receive a tube nut 7 which slidably embraces a shaft 8, the upper end of which is formed into a clevis 9 for engagement with a tongue 10, said tongue depending from the wing structure, in the usual manner. The lowermost end of the shaft 8 is threaded to receive an internally threaded member 11 which is subsequently locked in place by means of a pin 12. The member 11 retains the shaft 8 within the tube nut 7, and is also adapted to compensate for wear or end play between the members 7 and 8. 13 indicates a lock nut, coacting with the tube nut 7. 14 indicates a fairing or covering of streamline shape adapted to snugly though yieldingly embrace the strut 4. 15 indicates a cover plate removably secured to the fairing 14 by any suitable means. It will be noted that the clevis 9 and tongue 10 are held together by a bolt 16, which bolt also extends through the fairing 14 and holds it in place against the wing covering.

From the foregoing it is obvious that by advancing or retarding the tube nut 7 within the threaded aperture 6 of the block 5, the strut 4 will be lengthened or shortened correspondingly, and that by subsequently advancing the lock nut 13 on its threads until it abuts the block 5, the strut 4 will be securely locked into its adjusted position.

While I have shown a particular form of embodiment of my invention, I am aware that many minor changes therein will readily suggest themselves to others skilled in the art, without departing from the spirit and scope of my invention.

Having thus described my invention, what I claim as new and desire to protect by Letters Patent, is:

A strut terminal for aircraft, comprising an internally threaded body member mounted within a strut extremity, a threaded tubular member adapted to be advanced or retarded within the internally threaded body member, means embraced by said threaded tubular member for engagement with a wing appendage, and means for compensating wear or end play between said tubular member and said means embraced by said tubular member, a means for locking said threaded tubular member in any of its advanced, retarded, or otherwise adjusted positions, and means of corresponding section to the strut 4 housing the terminal and preserving the continuity of the strut in any of its positions.

In testimony whereof I affix my signature.

JOHN C. SANDERS.